United States Patent
Seal et al.

(10) Patent No.: US 8,329,299 B2
(45) Date of Patent: Dec. 11, 2012

(54) SOL-GEL COATING METHODS AND THIN FILM COATED SUBSTRATES THEREFROM

(75) Inventors: Sudipta Seal, Orlando, FL (US); Erik R. Brinley, Orlando, FL (US); Suresh Babu Krishna Moorthy, Orlando, FL (US); Abhilash Vincent, Orlando, FL (US); David Reid, Orlando, FL (US); Clara Rivero, Orlando, FL (US)

(73) Assignees: University of Central Florida Research Foundation, Inc., Orlando, FL (US); Lockheed Martin Missiles and Fire Control, Bethesda, MD (US)

( * ) Notice: Subject to any disclaimer, the term of this patent is extended or adjusted under 35 U.S.C. 154(b) by 1290 days.

(21) Appl. No.: 12/059,948

(22) Filed: Mar. 31, 2008

(65) Prior Publication Data

US 2008/0311390 A1    Dec. 18, 2008

Related U.S. Application Data

(60) Provisional application No. 60/908,829, filed on Mar. 29, 2007.

(51) Int. Cl.
  *B32B 27/32* (2006.01)
  *B32B 17/10* (2006.01)
  *B32B 17/06* (2006.01)
  *B05D 3/00* (2006.01)
  *B29C 71/02* (2006.01)

(52) U.S. Cl. ............ 428/411.1; 428/220; 428/332; 428/339; 428/426; 427/532; 427/541; 427/544; 427/331; 427/372.2; 427/379; 427/384

(58) Field of Classification Search .............. None
See application file for complete search history.

(56) References Cited

U.S. PATENT DOCUMENTS

| | | | | |
|---|---|---|---|---|
| 4,278,632 A * | 7/1981 | Yoldas | ............... | 264/621 |
| 4,830,879 A | 5/1989 | Debsikdar | | |
| 5,413,860 A * | 5/1995 | Minder et al. | ............. | 428/411.1 |
| 2004/0121451 A1 * | 6/2004 | Moritz et al. | ............. | 435/287.2 |

OTHER PUBLICATIONS

Deumié, et al., "Ellipsometry of light scattering from multilayer coatings", Applied Optics, vol. 35, No. 28, pp. 5600-5608, Oct. 1, 1996.

\* cited by examiner

*Primary Examiner* — Sheeba Ahmed
(74) *Attorney, Agent, or Firm* — Jetter & Associates, P.A.

(57) ABSTRACT

A method for depositing sol-gel derived coatings on substrates to form coated substrates includes the steps of providing a first solution including at least one sol precursor and at least one solvent. A water comprising solution is added to the first solution to form a sol-gel. The sol-gel is deposited on a substrate. The sol-gel layer on the substrate is dried/cured at a temperature $\leq 100°$ C. for at least 10 minutes to form a solid layer, wherein the solid layer has a thickness from 50 nm to 110 nm. The depositing and curing steps are repeated at least once until combined thickness of the solid layers forms a coating of a predetermined thickness. The resulting solid layers are low water content layers that can be evidenced by transmission measurements. The coated substrate can be an IR transmissive substrate having a recrystallization temperature $<130°$ C. and each of the solid layers provide a transmission at $\lambda=2950$ nm, normal incidence and 1 mW power if placed on the IR transmissive substrate of $\geq 99\%$ of the transmission directly through the IR transmissive substrate.

17 Claims, 2 Drawing Sheets

SOL-GEL COATING METHODS AND THIN FILM COATED SUBSTRATES THEREFROM

CROSS-REFERENCE TO RELATED APPLICATIONS

This application claims priority to Provisional Application No. 60/908,829 entitled "NEAR AMBIENT TEMPERATURE WATER REMOVAL METHOD FOR SOL-GEL THIN FILM COATINGS" filed on Mar. 29, 2007, which is incorporated by reference in its entirety into the present application.

FIELD OF THE INVENTION

The invention relates to sol-gel methods for forming thin film coated substrates and resulting film coated substrates.

BACKGROUND OF THE INVENTION

Sol-gel processing is a common method for the production of glass or ceramic materials. It involves the transformation of a liquid or colloidal sol into a gel which upon curing removes the liquid phase from the gel to provide a solid material. Typically a sol-gel precursor is subjected to a series of hydrolysis and condensation reactions to form a colloidal suspension which subsequently condenses into a gel network. The condensation occurs with the loss of a by-product that is ultimately driven from the gel to form the solid material. The process permits the formation of powders, monoliths, fibers, membranes, aerogels, and films.

The first and still one of the largest applications for sol-gel technology is for the formation of thin films, generally 0.5 μm or thinner. The films are generally produced on substrates that have been coated with the sol, the sol generally applied via spraying, electrophoresis, inkjet printing, roll-coating, dip-coating or spin-coating. The resulting coating constitutes a protective, decorative or optical coating. Optical coatings that are reflective or antireflective have been formed via sol-gel processing.

Coatings for optical applications (e.g. infrared and visible light) can be prepared via sol-gel techniques. Traditional sol gel processes generally involve the addition of water as a reagent to form the sol, often in excess of other constituent used. The resulting sol-gel materials generally have a high affinity for water. However, coatings for certain infrared applications should be substantially free of water or molecules comprising hydroxyl (—OH) groups to avoid absorption of certain wavelengths, such as 2950 nm. Achieving a substantially dry coating is a known problem for sol-gel derived coatings.

Unlike typical antireflective coatings for visible light applications where the layer thickness is generally about 125 to 400 nm and can be formed as a single layer by the sol-gel method, antireflective coatings for infrared applications generally require substantially greater thicknesses, such as about 500 to 1,000 nm, and thus generally require a multilayer coating. Even a small absorption by individual layers of the multilayer coating, plus absorption from a second side identical to the first, can compound into large absorptions by the coating. The specific absorption at about 2950 nm due to water has traditionally been a problem for IR applications.

Infrared applications affected by the absorption at 2950 nm include thermal imagery and infrared positioning, regarding either spatial or distance acuity. In both of these systems multiple lenses are generally needed, and multiple lenses further degrade the transmission by increasing absorption. To avoid significant limitations to these devices, coatings that can transmit nearly 100% of the infrared light with very little reflectance are needed.

The typical technique used for preparing coatings that display little water absorption for these applications comprises Physical Vapor Deposition (PVD), typically a sputtering process where atoms of a vaporized gas are propelled towards the substrate, impinging and bonding to its surface. This technique is performed under vacuum and generally has a small amount of water present, but even this small amount of water requires removal by high temperatures (e.g. >150° C.) to further reduce the amount of water present. Aside from the significant cost and complexity introduced by performing PVD over the traditional wet chemical synthesis, PVD transfers significant energy into the substrate material by the energy transfer when the vapor is impinged on the surface of the substrate.

These energy sources as well as the thermal energy of the drying can adversely affect the substrate material, particularly for certain amorphous substrate materials (e.g. chalcogenide glasses). Semiconductor glasses, such as certain chalcogenide glasses, are a common substrate choices for certain advanced optical devices since they generally transmit across the full range of the infrared regime of the electromagnetic spectrum. For example, energy from the PVD process or high temperature processing (e.g. >150° C.) can undesirably cause some partial crystallization of the amorphous substrate material, resulting in scattering at the interfaces with the crystallites, and as a result, a lowered transmittance.

Thus, there is a need for a low temperature method for forming low water content thin film coatings on substrates and resulting substrates having low water content coatings thereon. For infrared optical coatings, the method should introduce little energy into the underlying substrate to avoid partial crystallization of the amorphous substrate or damage in the case of certain polymer substrates.

SUMMARY OF INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A method for depositing sol-gel derived coatings on substrates to form coated substrates includes the steps of providing a first solution including at least one sol precursor and at least one solvent. A water comprising solution is added to the first solution to form a sol-gel. The sol-gel is deposited on a substrate. The sol-gel layer on the substrate is dried/cured at a temperature $\leq 100°$ C. for at least 10 minutes to form a solid layer, wherein the solid layer has a thickness from 50 nm to 110 nm. The depositing and curing steps are repeated at least once until combined thicknesses of the solid layers forms a coating of a predetermined thickness. The resulting solid layers are low water content layers solid layers. The lower water content can be evidenced by transmission measurements. In one embodiment the coated substrate is an IR transmissive substrate having a recrystallization temperature <130° C., and each of the solid layers provide a transmission at λ=2950 nm, normal incidence and 1 mW power if placed on the IR transmissive substrate of $\geq 99\%$ of the transmission directly through the same IR transmissive substrate.

DETAILED DESCRIPTION OF THE INVENTION

Figure 1:
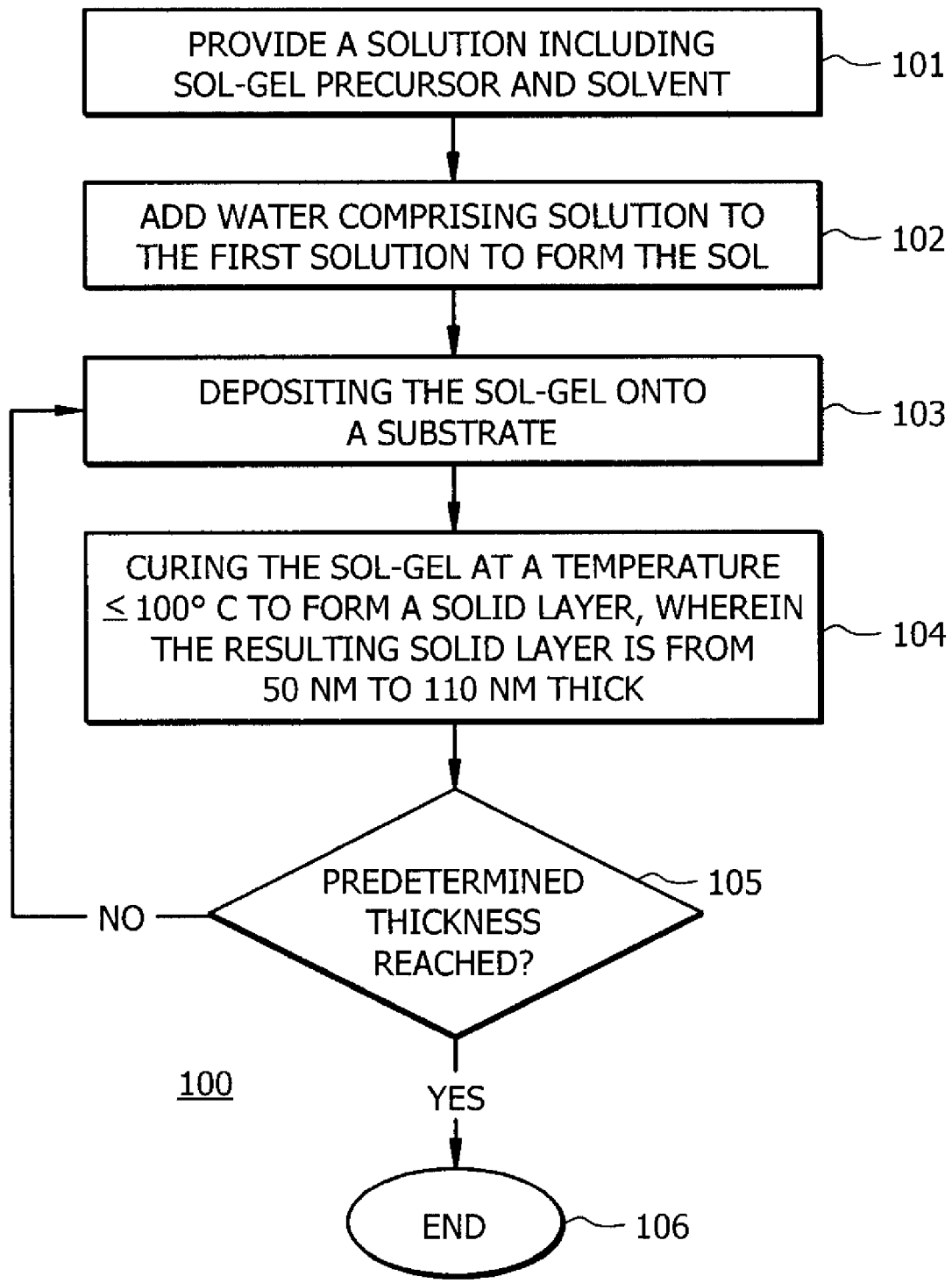
FIG. 1 provides steps for an exemplary sol-gel method for forming thin film coated substrates, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention comprise a low temperature method (the substrate being exposed to a maximum temperature $\leq 100°$ C.) that provides low water (and other hydroxyl group —OH) content sol-gel derived coatings, broadly applicable for a variety of substrates. The method generally permits high water removal efficiency from the coating at temperatures near normal room temperature. In one embodiment, resulting coatings can be formed on temperature sensitive substrates, such as certain chalcogenide glasses, for optical applications (e.g. lenses), including infrared optics (and visible optics).

Multilayer coatings according to embodiments of the invention comprise a plurality of stacked sol-gel derived thin film layers each from about 50 to about 110 nm thick, such as 60 to 100 nm thick. The Inventors have discovered that the relatively thin layers being generally <110 nm promotes substantially continuous porosity throughout the full thickness of layer. Continuous porosity avoids forming encapsulated water pockets within the layer that results in the layer retaining significant water content. Drying/curing at a temperature below 100° C., and generally at about 50° C. or less including room temperature, is applied after deposition of the sol-gel and generally started prior to achievement of the continuous solid coating. The curing/drying process is generally maintained for a period sufficient to reduce the absorption due to water (or other hydroxyl groups) to a level where transmission through the coated substrate at $\lambda=2950$ nm, normal incidence and 1 mW power is $\geq 99\%$ of transmission directly through the same substrate. The low temperature curing/drying protects the integrity of temperature sensitive substrates, such as certain polymer and glass (e.g. chalcogenide) substrates.

FIG. 1 provides steps for an exemplary sol-gel method 100 for forming thin film coated substrates according to an embodiment of the invention. In step 101, a first solution comprising at least one sol precursor and at least one solvent is provided. The silica or titania sol precursor can generally be any tetraalkoxysilane or tetraalkoxytitanate where the alkyl group comprises one to six carbons and can be a straight chain or a branched chain. The alkoxy groups can be of a single structure or 2, 3 or 4 different alkoxy groups can be attached to the silicon or titanium atom of the sol precursor molecule. The sol precursor is generally dissolved in a dry solvent. In general, but not necessarily, the solvent should be sufficiently miscible with water to promote initial hydrolysis of the sol precursor in the bulk of the solution rather than at an interface. One class of solvents that can be used is alcohols. The alcohol can be chosen empirically where the specific alcohol is that which provides a desired particle size. The alcohol can be, but is not necessarily, of the same structure as the alkoxy groups or one of the alkoxy groups of the sol precursor. The alcohol can comprise one or more of any one to six carbon alcohols and can be any straight or branched chained alcohol. In addition to the manner in which the sol is formed, the solvent can also be chosen for compatibility with the substrate to which the sol will be applied. Generally, a catalyst for the hydrolysis and/or condensation reactions that ultimately result in the coating layer can be included into the solution. The catalyst can be an acid, a base, or a complexing agent that interacts with the oxygen, metal atom, a carbon bound to the oxygen of the sol precursor, or the oxygen, metal atom, or hydrogen of the hydrolysis product of the sol precursor such that one or more of the reactions which result in the formation of the coating is catalyzed. Optionally, the solution can be heated to any temperature necessary to promote mixing or exchange of alkoxy groups as needed. In general, no external heating is needed since ambient temperature is generally sufficient.

In step 102, a water comprising solution (e.g. water, or an acid or base solution) is added to the first solution to form the sol that develops into a sol-gel. The water can be generally added at any rate and at any temperature. In one embodiment the temperature can be maintained at or near normal room temperature, such as at 15 to 30° C. In general, the water is added slowly. The addition rate generally depends on the absolute and relative rates of hydrolysis and condensation that yield the sol such that the colloidal particles have a desired size and the sol has a desired viscosity. The rate for water addition and the temperature of addition is generally determined empirically and the appropriate addition rate and temperature depends on the structure of the sol precursor, the alcohol, or any catalyst that is used. Optionally, the viscosity of the sol can be increased by the addition of a thickening agent, such as a polymer miscible with the sol or decreased by the addition of the same or a different solvent that was used for the formation of the sol. One specific thickening agent that can generally be used is hydroxypropylcellulose. In one embodiment, the same sol-gel solution can be used for all the multiple layer coatings described below.

In step 103, the sol-gel is deposited on a substrate. The sol can generally be applied via any coating technique including spraying, brushing, dipping or spinning depending upon the size and shape of the substrate. For infrared applications, the substrate can comprise an amorphous glass, or semiconductors such as silicon and germanium. Chalogenide glasses can include $As_2S_3$, $As_2Se_3$, or include other chalcogenides, such as S, Se or Te. The substrate can comprise certain polycrystalline structures, such as ZnS or ZnSe.

However, between the adding step (step 102) and step 103 a delay generally performed at room temperature of at least 3 hours can be provided before the depositing step. In one embodiment a minimum 24 hours time is provided for the sol to go through an essentially complete hydrolysis condensation cycle. This will substantially eliminate the presence of any unreacted residual organic precursor, such as alkoxyl groups. In contrast, plasma treatment was found to be generally harmful to the coating as it can lead to sputtering and removal of coating materials. Moreover, plasma exposure was found to generally be ineffective for eliminating water in the coating.

In step 104, the sol-gel layer is cured/dried on the substrate at a temperature ≦100° C. for at least 10 minutes to form a solid layer, wherein the solid layer has a thickness from 50 nm to 110 nm. The curing process is generally carried in a dry and dust-free atmosphere and at temperatures significantly below 100° C., such as below 50° C., and can be below 30° C., such as room temperature (e.g. 20° C.). The maximum curing temperature used is generally limited to the structure of the substrate and the nature of the sol. Temperatures should generally be kept below that where any undesired change in the shape or optical properties (e.g. from crystallization) of the substrate occurs.

The curing temperature can be below any temperature where the substrate or substrate coating interface can be compromised. In general, the curing should be carried out at a temperature less than 100° C., such as <50° C. or below. The temperature for curing and the time for curing can be determined empirically and the time for completion of curing can be determined by examining the transmission optical properties of the coating at about 2950 nm. Although a reduced pressure (partial vacuum) can be used during the cure, in some cases a partial vacuum can result in the formation of bubbles resulting when the liquid portion of the sol boils or otherwise is lost at too high a rate. Curing for each coating layer of the multilayer coating is generally carried out for a period of one to ten hours, depending upon thickness of the coating, the sol precursor, the solvent (e.g. alcohol), or any catalyst that is used.

Curing is generally commenced in as a short time as possible after deposition of the sol-gel. Generally, the time window between deposition of the sol-gel solution and the curing step is small, such as approximately 10 minutes. For optical coatings, the curing, as with all previously performed steps, should be carried out in a substantially dust free environment to assure good optical properties of the final coating.

In step 105, it is determined whether the predetermined desired thickness is reached. The predetermined thickness is generally at least 125 nm, and for infrared applications is generally 500 to 1,000 nm. Since the predetermined thickness >the 50 nm to 110 nm thickness of the solid layer, the steps of depositing and curing are repeated at least once. If the predetermined thickness is not reached, steps 103 and 104 are repeated until the predetermined thickness is obtained.

In one embodiment, a dry coating is achieved by the curing step being for a period of at least 2 hours, such as 2 to 6 hours. Though essentially any sol-gel derived oxide coating containing little water or other hydroxyl group containing molecules can be prepared via embodiments of the invention, in particular, for infrared applications titania and silica based coatings are generally prepared. Other oxides that can be useful for infrared applications include vanadium oxide and cerium oxide.

As described above, the coating comprises a plurality of stacked thin film layers. Generally, the thickness of each of the thin film layers is held to <110 nm, such as 50 nm to 100 nm. As described above, it has been discovered that layers >about 110 nm form water containing pockets where the transport of water out of the layer is inhibited during curing and thus remains in the cured coating layer. As known in the art, for IR applications, water in the pockets reduces IR transparency due to water absorption. As an optical coating for infrared applications, the coating process will generally be repeated 4 to 9 or more times to achieve the final desired coating thickness.

The formation of the sol by the addition of water to the sol precursor solution is generally the first step that can be repeated to provide a consistent reproducible layer thickness since the sol can change in structure with time, particularly during the relatively long time required for curing. For a hydrolyzed sol solution that structures into a colloidal suspension that remains essentially unchanged with time prior to exposure to the curing conditions, the step of water addition need not be repeated with the steps of deposition and cure. In such a case the necessary time window between deposition of the sol and the heating to cure can be relatively large. In some cases the step of preparing the sol precursor solution should also be repeated for a consistent sol formation, particularly where the sol precursor has various alkoxy groups and where the solvent is an alcohol with a different alkoxy portion than the sol precursor such that alkoxy exchange can occur and change the structure of the sol precursor and the sol that results.

Figure 2:
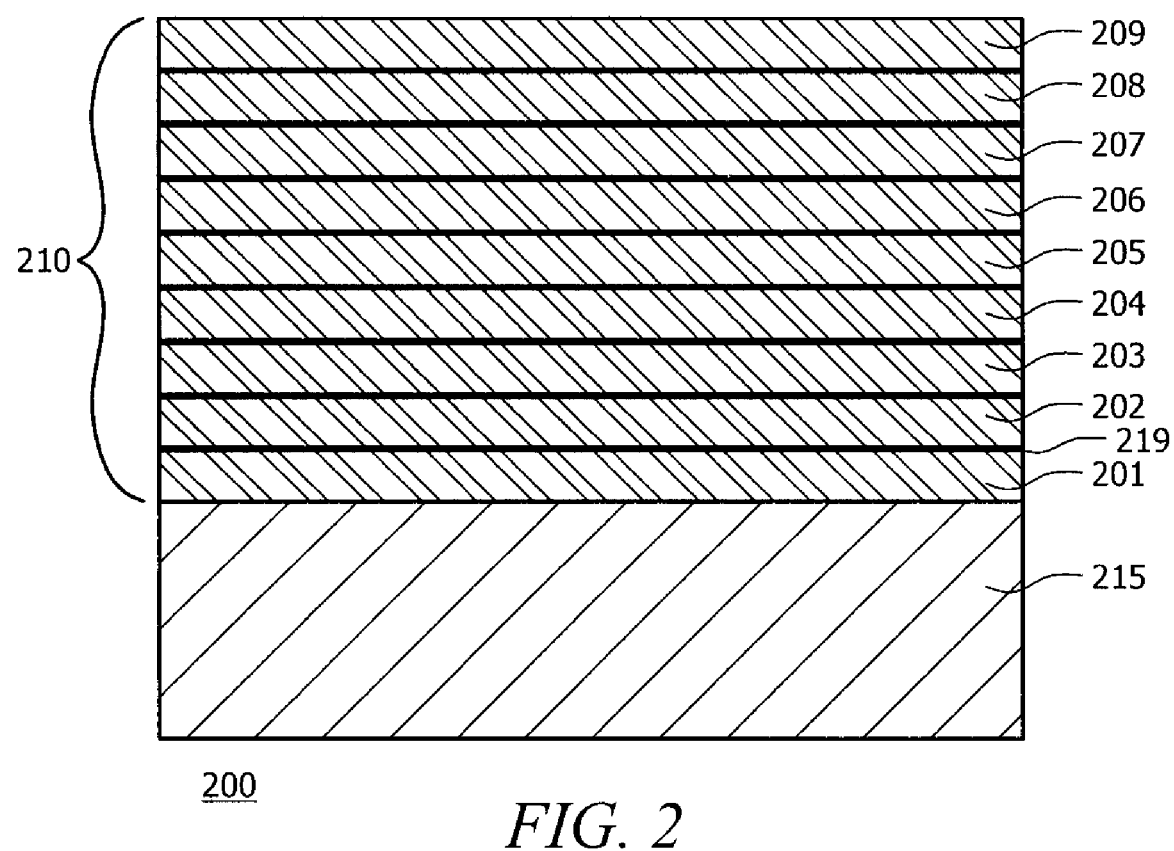
FIG. 2 is cross sectional depiction of a multi-layer device comprising a thin film sol-gel derived thin film coated substrate, wherein the thin film coating comprises a plurality of stacked thin filmed layers, according to an embodiment of the present invention.

Embodied as an optical coating, coatings according to embodiments of the invention can be used for a variety of optical applications, including antireflection filters, reflective filters, dielectric filters. FIG. 2 shows a cross sectional schematic of a multilayer device 200 comprising a thin film coated substrate, according to an embodiment of the invention. In one embodiment, thin film coated substrate is part of an optical system wherein the thin film coating is an anti-reflection coating that is provided on an optical element in the optical system. Substrate 215 can be a variety of substrates, including polymer substrates in certain embodiments. For infrared applications, the substrate 215 comprises an "IR transmissive substrate" used herein to denote a substrate that transmits IR energy of wavelengths of from about 1 to about 15 microns, such as from about 2 to about 12 microns. The IR transmissive substrate can comprise a glass, a semiconductor such as silicon or germanium, poly-crystalline IR materials such as ZnS or ZnSe, or a chalcogen comprising material such as S, Se, Te. Coating 210 is a multilayer coating shown comprising nine (9) layers 201-209, each having a very thin interface region 219 between the respective layers that results from formation of individual layers through a plurality of depositing and curing steps. As described above, the thickness of layers 201-209 are generally ≦110 nm, such as in the range from about 50 nm to 100 nm.

To retain the bonding strength between the respective layers 201-209, and hence the mechanical integrity of the overall coating 210 it is generally important to avoid as much interfacial features as possible. Atmospheric contamination is essentially absent since the process is performed in a dry and dust free environment as described above. Although, coating process parameters are generally selected to minimize any major porous formation between the successive layers 201-209, complete removal of added porosity in the interface regions is generally not achievable and as interface region 219 can be distinguished from layers 201-209 by its higher relative porosity and lower density.

Although the respective coating layers in the multilayer coating are described herein as being compositionally the same, alternating layers of high and low index materials (e.g. $TiO_2$ and $SiO_2$) can be used for the production of certain optical coatings according to embodiments of the invention. Moreover, individual layers can include mixed compositions (e.g. $SiO_2$ and $CeO_2$).

Multilayer coatings according to embodiments of the invention can be used outside optical applications. For example, multilayer coatings according to embodiments of the invention can be used for catalytic coatings.

The inventive method is described by the following Examples below. However the invention is not limited by these Examples.

EXAMPLES

The Examples below describe the sol-gel formation of a single layer coating on a substrate. To form multilayer coatings according to the invention, the sol-gel deposition and curing steps described below are generally repeated.

In a dust free and moisture free environment, 4.2 mL of acetylacetone was added to a 179 mL portion of anhydrous 2-propanol and the resulting solution stirred magnetically for 10 minutes. To the solution was added 12 mL of titanium isopropoxide dropwise. The solution turned yellow after stirring for 20 minutes. Water, 60 mL, was added dropwise to the solution over a period of 30 minutes. The solution was covered and stirred for an additional 12 hours where a yellow-orange opaque suspension, sol, was first observed and a sol-gel later formed as the sol went through hydrolysis. This sol-gel was used for deposition on a silicon wafer substrate by spin-coating. There was no cleaning of the substrate surface before the sol-gel deposition. Immediately (<1 minute) after the deposition, the coated substrate was dried/cured at 50° C. in a dry environment for 5 hours. Following curing, the cured 100 nm thick titania coated wafer displayed an IR transmission at $\lambda=2950$ nm, normal incidence and 1 mW power on the silicon substrate of $\geqq 99\%$ of the transmission directly through the IR transmissive substrate.

In like manner a silica coating was prepared on a silicon substrate. The silica coating was prepared by the substitution of tetraethoxysilane for the titanium isopropoxide at the same molar proportion relative to the acetylacetone. As with the titania coating, the silica coated silicon wafer displayed an IR transmission that was 99% of that for the uncoated wafer at $\lambda=2950$ nm.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular, variations on the sol precursors, solvents, catalysts, thickeners, substrates and coating techniques will be apparent to those skilled in the art. While a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for depositing sol-gel derived coatings on substrates, comprising the steps of:
   providing a first solution comprising at least one sol precursor and at least one solvent;
   adding a water comprising solution to said first solution to form a sol-gel;
   depositing said sol-gel on a substrate, wherein said substrate comprises an amorphous chalcogenide comprising material;
   curing said sol-gel layer on said substrate at a temperature $\leqq 100°$ C. for at least 10 minutes to form a solid layer, wherein said solid layer has a thickness from 50 nm to 110 nm; and
   repeating said steps of depositing and curing at least once until combined ones of said solid layers forms a coating of a predetermined thickness.

2. The method of claim 1, wherein said sol precursor comprises a metal alkoxy sol precursor comprising a tetraalkoxysilane, where the alkoxy groups comprise independently one to six carbons.

3. The method of claim 1, wherein said sol precursor comprises a metal alkoxy sol precursor comprising a tetraalkoxytitanate, where the alkoxy groups comprise independently one to six carbons.

4. The method of claim 1, wherein said solvent is a 1 to 6 carbon alcohol.

5. The method of claim 1, wherein said solution further comprises a catalyst.

6. The method of claim 1, wherein a temperature for said curing step is between 20° C. and 50° C.

7. The method of claim 1, wherein said predetermined thickness is from 800 to 1,100 nm.

8. The method of claim 1, wherein said curing step is performed within 10 minutes after said depositing step.

9. The method of claim 1, wherein said substrate comprises an IR transmissive substrate having a recrystallization temperature <130° C. and each of said solid layers provide a transmission at $\lambda=2950$ nm, normal incidence and 1 mW power if placed on said IR transmissive substrate of $\geqq 99\%$ of said transmission directly through said IR transmissive substrate.

10. A coated substrate, formed by a sol-gel process comprising the steps of:
    providing a first solution comprising at least one sol precursor and at least one solvent;
    adding a water comprising solution to said first solution to form a sol-gel;
    depositing said sol-gel on a substrate, wherein said substrate comprises an IR transmissive amorphous chalcogenide comprising material having a recrystallization temperature <130° C.;

curing said sol-gel layer on said substrate at a temperature ≦100° C. for at least 10 minutes to form a solid layer, wherein said solid layer has a thickness from 50 nm to 110 nm; and repeating the steps of depositing and curing at least once until combined ones of said solid layers form a coating of a predetermined thickness, wherein each of said solid layers provide a transmission a transmission at λ=2950 nm, normal incidence and 1 mW power if placed on said IR transmissive substrate of ≧99% of said transmission directly through said IR transmissive substrate.

11. The coated substrate of claim 10, wherein said predetermined thickness is from 800 to 1,100 nm.

12. A multi-layer device, comprising:

a substrate;

a multilayer coating comprising a plurality of stacked layers on said substrate, wherein each of said plurality of stacked layers have a thickness between 50 nm and 110 nm, and an interface region interposed between said plurality of coating layers, wherein said substrate comprises an IR transmissive substrate comprising an amorphous chalcogenide comprising material having a recrystallization temperature <130° C. and each of said solid layers provide a transmission at λ=2950 nm, normal incidence and 1 mW power if placed on said IR transmissive substrate of ≧99% of said transmission directly through said IR transmissive substrate.

13. The device of claim 12, wherein said amorphous chalcogenide comprising material comprises S, Se or Te.

14. The device of claim 12, wherein said plurality of stacked layers comprise silica or titania.

15. The method of claim 1, wherein said repeating said steps of depositing comprises alternating said sol precursor between higher and lower refractive index sol precursor materials, and wherein said coating comprises alternating layers of higher and lower refractive index materials.

16. The coated substrate of claim 10, wherein said repeating said steps of depositing comprises alternating said sol precursor between higher and lower refractive index sol precursor materials, and wherein said coating comprises alternating layers of higher and lower refractive index materials.

17. The device of claim 12, wherein said coating comprises alternating layers of higher and lower refractive index materials.

* * * * *